United States Patent
Yuan

(10) Patent No.: US 11,867,204 B2
(45) Date of Patent: Jan. 9, 2024

(54) PIEZOELECTRIC RING BENDER SERVO VALVE ASSEMBLY FOR AIRCRAFT FLIGHT CONTROL ACTUATION AND FUEL CONTROL SYSTEMS

(71) Applicant: Michael Yuan, Irvine, CA (US)

(72) Inventor: Michael Yuan, Irvine, CA (US)

(*) Notice: Subject to any disclaimer, the term of this patent is extended or adjusted under 35 U.S.C. 154(b) by 11 days.

(21) Appl. No.: 18/169,202

(22) Filed: Feb. 14, 2023

(65) Prior Publication Data
US 2023/0204052 A1    Jun. 29, 2023

Related U.S. Application Data

(63) Continuation of application No. 16/403,303, filed on May 3, 2019, now Pat. No. 11,608,840.
(Continued)

(51) Int. Cl.
*F15B 13/043*      (2006.01)
*F16K 31/00*       (2006.01)
(Continued)

(52) U.S. Cl.
CPC ........ *F15B 13/0438* (2013.01); *B64C 23/005* (2013.01); *F02C 9/26* (2013.01);
(Continued)

(58) Field of Classification Search
CPC .......... F15B 13/0438; F15B 2211/6656; F15B 2013/0409; F16K 31/005; F16K 31/006;
(Continued)

(56) References Cited

U.S. PATENT DOCUMENTS 2,953,123 A * 9/1960 Reen ................. F15B 21/12
116/DIG. 42
3,023,782 A * 3/1962 Chaves, Jr. ......... F15B 13/0438
137/85
(Continued)

FOREIGN PATENT DOCUMENTS

DE     3608550        9/1987
DE     4311216 A1    10/1994
(Continued)

OTHER PUBLICATIONS

F Bauer: "The use of piero-actuators for high dynamic servovalves", Olhydraulik Und Pneumatik, vol. 49, No. 6, Jan. 1, 2005 (Jan. 1, 2005), pp. 14-15, XP055096530.

*Primary Examiner* — William M McCalister
(74) *Attorney, Agent, or Firm* — KOS IP Law LLP; James Yang

(57) ABSTRACT

A piezoelectric ring bender servo valve assembly reduces mechanical wear by removing mechanical components used in prior art servo valves. The assembly does not use torque motor, flapper, and feedback spring. In this manner, no moving parts are required, which reduces maintenance and costs. A pair of piezoelectric ring benders mount adjacently to a pair of nozzles. The piezoelectric ring benders independently regulate the flow of fluid through the nozzles by moving between an open position to enable flowage, and a closed position to restrict flowage. A linear position sensing device measures and provides feedback about the spool position to a valve controller. The valve controller allows the spool valve to move until valve position achieves command position and the force on the spool valve is in equilibrium with pressure difference across spool valve. An H-bridge operable to switch the polarity of a differential pressure applied across to a load.

20 Claims, 5 Drawing Sheets

Related U.S. Application Data

(60) Provisional application No. 62/720,454, filed on Aug. 21, 2018.

(51) Int. Cl.

| | | |
|---|---|---|
| *F16K 11/07* | (2006.01) | |
| *F16K 31/42* | (2006.01) | |
| *G05D 16/20* | (2006.01) | |
| *F15B 13/04* | (2006.01) | |
| *B64C 23/00* | (2006.01) | |
| *F02C 9/26* | (2006.01) | |

(52) U.S. Cl.
CPC ........ *F16K 11/0712* (2013.01); *F16K 31/005* (2013.01); *F16K 31/42* (2013.01); *F15B 2013/0409* (2013.01); *F15B 2211/6656* (2013.01); *G05D 16/2093* (2013.01); *Y10T 137/86598* (2015.04); *Y10T 137/86606* (2015.04); *Y10T 137/86614* (2015.04)

(58) Field of Classification Search
CPC ..... F16K 31/42; F16K 11/07; G05D 16/2093; Y10T 137/8659; Y10T 137/86598; Y10T 137/86606; Y10T 137/86614
USPC ............. 137/625.61, 625.62, 625.63, 625.64
See application file for complete search history.

(56) References Cited

U.S. PATENT DOCUMENTS

| | | | | |
|---|---|---|---|---|
| 3,152,612 | A * | 10/1964 | Avery ................... | F16K 31/006 91/363 R |
| 3,390,615 | A * | 7/1968 | Hayner .................... | F15B 9/17 91/363 R |
| 3,555,970 | A * | 1/1971 | Borgeson ................ | F15B 13/16 91/363 R |
| 3,804,120 | A * | 4/1974 | Garnett ............... | F15B 13/0433 137/625.64 |
| 4,061,155 | A * | 12/1977 | Sopha ................ | F15B 13/0436 137/487 |
| 4,705,059 | A * | 11/1987 | Lecerf ................ | F15B 13/0438 137/625.61 |
| 5,148,735 | A * | 9/1992 | Veletovac ............ | H02N 2/0075 91/461 |
| 5,240,041 | A * | 8/1993 | Garnjost ............... | F15B 13/043 137/625.62 |
| 5,549,137 | A * | 8/1996 | Lenz ...................... | G05D 7/005 137/86 |
| 5,709,245 | A * | 1/1998 | Miller ................. | F15B 13/0438 137/625.62 |
| 9,010,360 | B1 * | 4/2015 | Older ..................... | G05B 15/02 137/599.05 |
| 10,767,778 | B2 * | 9/2020 | Jaśkiewicz ........... | H10N 30/204 |
| 11,608,840 | B2 * | 3/2023 | Yuan ...................... | F16K 31/005 |
| 2001/0047828 | A1 | 12/2001 | Berger .................. | F16K 31/006 137/596.17 |
| 2004/0261856 | A1* | 12/2004 | Klaver .................... | F16K 37/00 137/487.5 |
| 2007/0045579 | A1* | 3/2007 | Wirtl .................... | G05D 16/163 251/129.04 |
| 2010/0033192 | A1* | 2/2010 | Somfalvy .............. | F15B 19/005 324/555 |
| 2013/0000753 | A1* | 1/2013 | Penning ................ | F15B 19/002 251/324 |
| 2014/0238496 | A1* | 8/2014 | Offner .................... | C12M 41/20 137/88 |
| 2016/0160886 | A1* | 6/2016 | Baker .................. | F15B 13/0438 251/30.01 |
| 2016/0195415 | A1* | 7/2016 | Lull .......................... | G01F 1/50 73/861.01 |
| 2018/0347713 | A1* | 12/2018 | Grödl .................. | F15B 13/0438 |
| 2019/0389564 | A1* | 12/2019 | Medaglia ............ | F15B 13/0438 |
| 2020/0056636 | A1 | 2/2020 | Jaskiewicz | |
| 2020/0063883 | A1* | 2/2020 | Yuan ................... | F15B 13/0438 |
| 2020/0166151 | A1 | 5/2020 | Jaskiewicz | |
| 2020/0348702 | A1* | 11/2020 | Nagarajan ............ | G05D 7/0623 |

FOREIGN PATENT DOCUMENTS

| | | |
|---|---|---|
| WO | 0159306 | 8/2001 |
| WO | 2017071753 A1 | 5/2017 |

* cited by examiner

PIEZOELECTRIC RING BENDER SERVO VALVE ASSEMBLY FOR AIRCRAFT FLIGHT CONTROL ACTUATION AND FUEL CONTROL SYSTEMS

CROSS REFERENCE OF RELATED APPLICATIONS

This application is a continuation of U.S. application Ser. No. 16/403,303, filed on 2019 May 03, which claims the benefit of U.S. Provisional Application No. 62/720,454, filed on 2018 Aug. 21, the contents of which are expressly incorporated by reference herein.

FIELD OF THE INVENTION

The present invention relates generally to a piezoelectric ring bender servo valve assembly for aircraft flight control actuation and fuel control systems. More so, a piezoelectric servo valve reduces mechanical wear and tear by removing the prior art torque motor, flapper, and feedback spring, and replacing with a pair of piezo bendable members, so that the piezoelectric servo valve is substantially free of moving parts; whereby the assembly: replaces an electromagnetic torque motor and the transducer effect therefrom, with a pair of piezoelectric bendable members that are mounted directly adjacent to a pair of nozzles; independently regulates the flow of fluid through the nozzles; replaces the flappers with the piezoelectric bendable members; replaces the feedback spring that regulates the spool valve with a linear position sensing device that measures and provides feedback about the spool position to a valve controller, and a valve controller that allows the spool valve to move until the valve position achieves command position and the force on the spool valve is in equilibrium with the pressure difference across the spool valve; and forms an H-bridge where the pair of nozzles are the variable restrictors controlled by valve control software, generating a pressure difference across the spool valve when the piezoelectric bendable members bend away from the nozzle.

BACKGROUND OF THE INVENTION

The following background information may present examples of specific aspects of the prior art (e.g., without limitation, approaches, facts, or common wisdom) that, while expected to be helpful to further educate the reader as to additional aspects of the prior art, is not to be construed as limiting the present invention, or any embodiments thereof, to anything stated or implied therein or inferred thereupon.

Those skilled in the art will recognize that two stage electrohydraulic servo valve with mechanical feedback are widely being used in the control of aircraft flight control actuation and fuel control systems and in virtually wherever a lightweight and compact servo control valve would prove advantageous. It is also known that the prior art servo valve utilizes an electromagnetic torque motor supported on a flexure tube which gives a friction-free pivot as well as isolating the torque motor from the hydraulic fluid. The toque motor acts as an electrical to mechanical transducer and converts electrical signals into mechanical torque.

The prior art servo valve also utilizes a flapper, driven by the torque motor, differentially restricts the flow from a pair of nozzles. Further, the prior art servo valve has a 1st stage hydraulic circuit forms an H-bridge, where the pair of nozzles are the variable restrictors, generating a pressure difference across the spool when the flapper is off center. The feedback spring allows the spool to move until the restoring force on the flapper is in equilibrium with the electromagnetic torque, so the flapper recentralizes. The present invention reduces mechanical wear and tear by removing chief mechanical components from the known prior art servo valve.

Generally, the piezoelectric effect is the ability of certain materials to generate an electric charge in response to applied mechanical stress. The piezoelectrical properties of quartz are useful as a standard of frequency. Quartz clocks employ a crystal oscillator made from a quartz crystal that uses a combination of both direct and converse piezoelectricity to generate a regularly timed series of electrical pulses that is used to mark time.

Other proposals have involved valves for aircraft flight control actuation and fuel control systems. The problem with these systems is that they create great wear-and-tear in the metal mechanical components, such as valves, springs, and flaps. Even though the above cited gripping devices meets some of the needs of the market, a piezoelectric ring bender servo valve assembly for aircraft flight control actuation and fuel control systems is still desired.

SUMMARY

Illustrative embodiments of the disclosure are generally directed to a piezoelectric ring bender servo valve assembly for aircraft flight control actuation and fuel control systems. The piezoelectric ring bender servo valve assembly serves to replaces prior art electromagnetic torque motor and the consequential transducer effect therefrom, with a pair of piezoelectric bendable members that mount directly adjacent to a pair of nozzles.

The piezoelectric bendable members selectively enable and restrict flow through the nozzles. The piezoelectric bendable members are configured to independently regulate the flow of fluid through the nozzles. The piezoelectric bendable members also replace the flappers found in the prior art servo valve by performing substantially the same function.

In some embodiments, the assembly replaces the feedback spring that regulates the spool valve with a linear position sensing device. The linear position sensing device is configured to measure and provide feedback about the spool position to a valve controller. Also, the assembly provides a valve controller that allows the spool valve to move until the valve position achieves command position and the force on the spool valve is in equilibrium with the pressure difference across the spool valve.

The assembly is also configured with a different H-bridge that that taught in the prior art. The disclosed H-bridge is operational so that the pair of nozzles serve as the variable restrictors, and are controlled by valve control software. This generates a pressure difference across the spool valve when the piezoelectric bending element bends away from the nozzles.

In one possible embodiment, the piezoelectric ring bender servo valve assembly provides various piezoelectric-based components that reduce the need for metal, wear-and-tear components from prior art. The assembly may include a valve housing, the valve housing being defined by a passageway, the passageway being operable to carry a fluid.

The assembly also provides a pair of nozzles, the nozzles being in communication with the fluid, the nozzles terminating at a pair of orifices.

The assembly also provides a pair of piezoelectric ring benders disposed adjacent to the nozzles, the piezoelectric ring benders being operable to bend independently of each other to an open position away from the nozzles to enable flowage of the fluid through the nozzles, the piezoelectric ring benders being operable to return to a closed position towards the nozzles to at least partially restrict flow through the nozzles.

Additionally, the assembly may include a piezo driver operable to actuate the piezoelectric ring benders.

The assembly also provides a spool valve operationally connected to the piezoelectric ring benders, the spool valve being disposed in at least one spool position to regulate flow of the fluid through the passageway, the piezoelectric ring benders controlling operation of the spool position.

The assembly may also include a variable restrictor operatively connected to the nozzles, the variable restrictor generating a pressure difference across the spool valve when the piezoelectric ring benders are in the open position, the variable restrictor being controlled by a valve control software.

The assembly also provides a linear position sensing device operationally connected to the spool valve, the linear positioning device determining the spool position of the spool valve, the linear positioning device providing feedback about the spool position.

Further, the assembly may include a valve controller operationally connected to the linear position sensing device and the spool valve, the valve controller receiving the feedback from the linear position sensing device, based on the feedback the valve controller allows the spool valve to move until the spool position achieves a command position and a force on the spool valve is in equilibrium with the pressure difference across the spool valve.

The assembly also provides an H-bridge operable to switch the polarity of a differential pressure applied across to a load, the H-bridge comprising four switches.

In another aspect, the electrical signal generated by the valve controller operationally connected to the piezo driver controls the piezoelectric bendable members to bend.

In another aspect, the piezoelectric bendable members are non-metallic.

In another aspect, the piezoelectric bendable members comprise piezoelectric ring benders.

In another aspect, the piezoelectric bendable members comprise a monolayer made of one layer of piezoceramic material pressed with up to 1 MN compacting force, or a multilayer made by tape casting very thin layers of piezoceramic material on which thin layers of electrode material is deposited.

In another aspect, a piezo driver actuates the piezoelectric bendable members.

In another aspect, the loop on the spool position is closed so that the parameter degradation inside the loop is compensated by the control loop.

One objective of the present invention is to minimize mechanical wear and tear on a servo valve.

Another objective is to provide a piezoelectric servo valve that does not utilize a torque motor, flapper, or feedback spring, so as to reduce mechanical wear and tear.

Another objective is to provide a pair of piezoelectric bendable members directly in front of, and restricting flow through, the nozzles of the servo valve.

Another objective is to provide a highly reliable servo valve which is essentially free of mechanical failures. This is achieved by remove torque motor, flapper and feedback spring and use piezo bendable members so that the servo valve first stage becomes free of moving parts.

Another objective is to provide a highly reliable servo valve which is not prone to fluid contamination. This is achieved by independently restrict each nozzle so that the spool valve maximum chip shear force is available at all times and at any position.

Another objective is to provide a highly reliable servo valve which is not prone to nozzle blockage. This is achieved by independently restrict each nozzle so that the nozzle size can be independently selected to meet the maximum contaminant particle size requirement to prevent nozzle from being blocked by the contaminant particles.

Another objective is to provide a low power loss servo valve so that the continued flow loss through the nozzles are minimized. This is achieved by independently restrict each nozzle so that one of the nozzles is always closed at any given time and both nozzles are closed or mostly closed when the valve is in a standby state. The amount of quiescent flow through the nozzle equals the flow required to hold the spool valve in place.

Another objective is to provide a very high bandwidth servo valve. This is achieved by independently restrict each nozzle so that the fixed orifice can be sized based on servo valve bandwidth requirement.

Another objective is to provide a servo valve free of null bias and shift. This is achieved by closing the loop on the spool position so that the parameter degradation inside the loop will be compensated by the control loop.

Another objective is to provide a servo valve which is relatively simple and compact in construction, easy to manufacture and free of adjustment. This is achieved by removing the torque motor, flapper, and feedback spring and using piezo bendable members so that the servo valve construction becomes simpler and compact, easy to manufacture, and free of adjustments.

Another objective is to provide a servo valve which can operate and survive in a high g-force and high vibration environment. This is achieved by removing the torque motor, flapper, and feedback spring and using piezo bendable members so that the servo valve first stage becomes free of moving parts.

Other systems, devices, methods, features, and advantages will be or become apparent to one with skill in the art upon examination of the following drawings and detailed description. It is intended that all such additional systems, methods, features, and advantages be included within this description, be within the scope of the present disclosure, and be protected by the accompanying claims and drawings.

BRIEF DESCRIPTION OF THE DRAWINGS

The invention will now be described, by way of example, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

Figure 1:
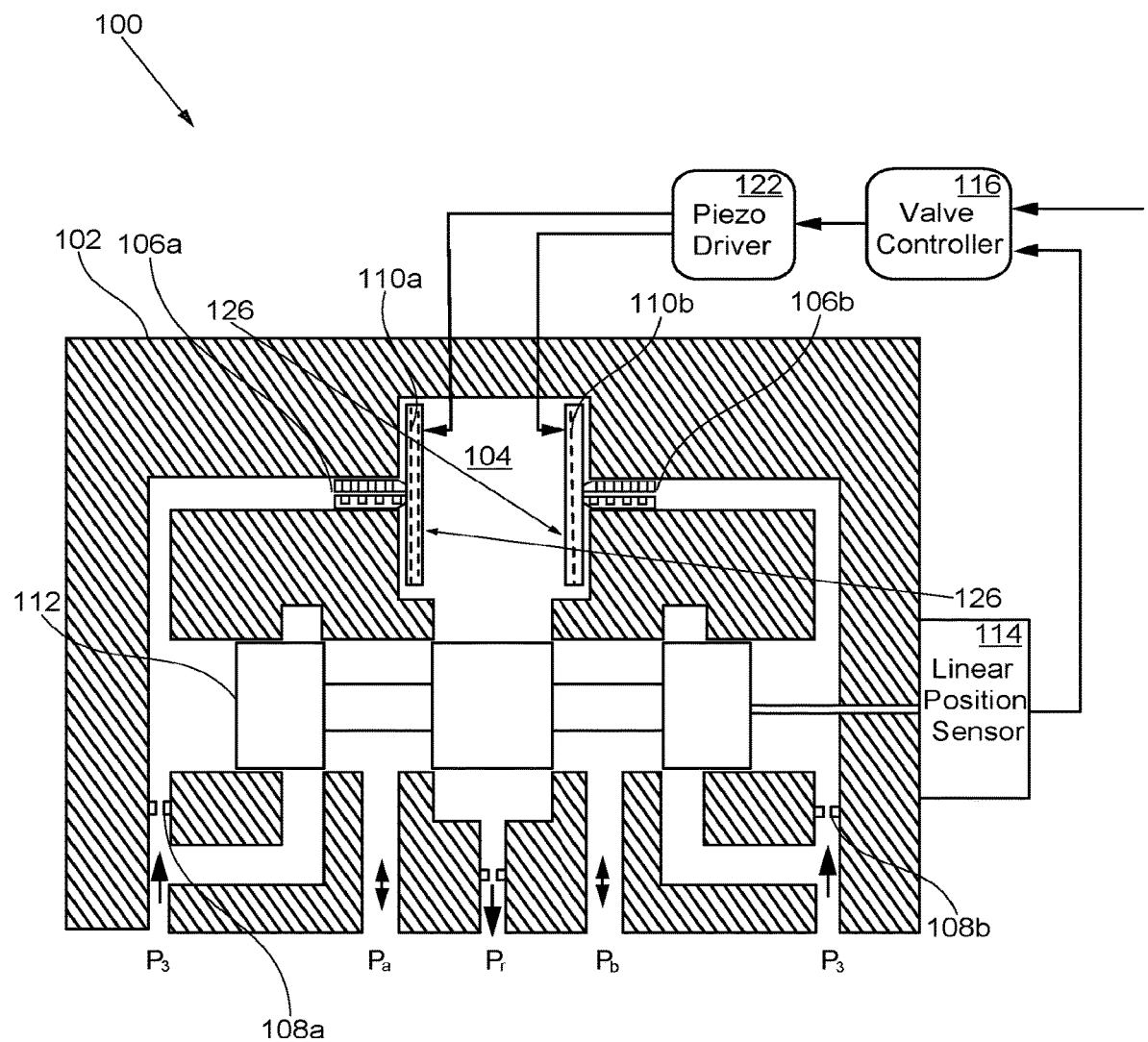
FIG. 1 illustrates a diagram of an exemplary piezoelectric ring bender servo valve assembly for aircraft flight control actuation and fuel control systems, showing a pair of piezoelectric bendable members in a closed position, in accordance with an embodiment of the present invention.

FIG. 1 references a piezoelectric ring bender servo valve assembly 100 for aircraft flight control actuation and fuel control systems. The piezoelectric ring bender servo valve assembly 100, hereafter "assembly 100" comprises a valve housing 102 that provides a protective casing for the components of the assembly 100. The housing 102 forms the structural framework for a servo valve. Suitable materials for the housing 102 may include, without limitation, steel, iron, metal alloys, and titanium.

Figure 3:
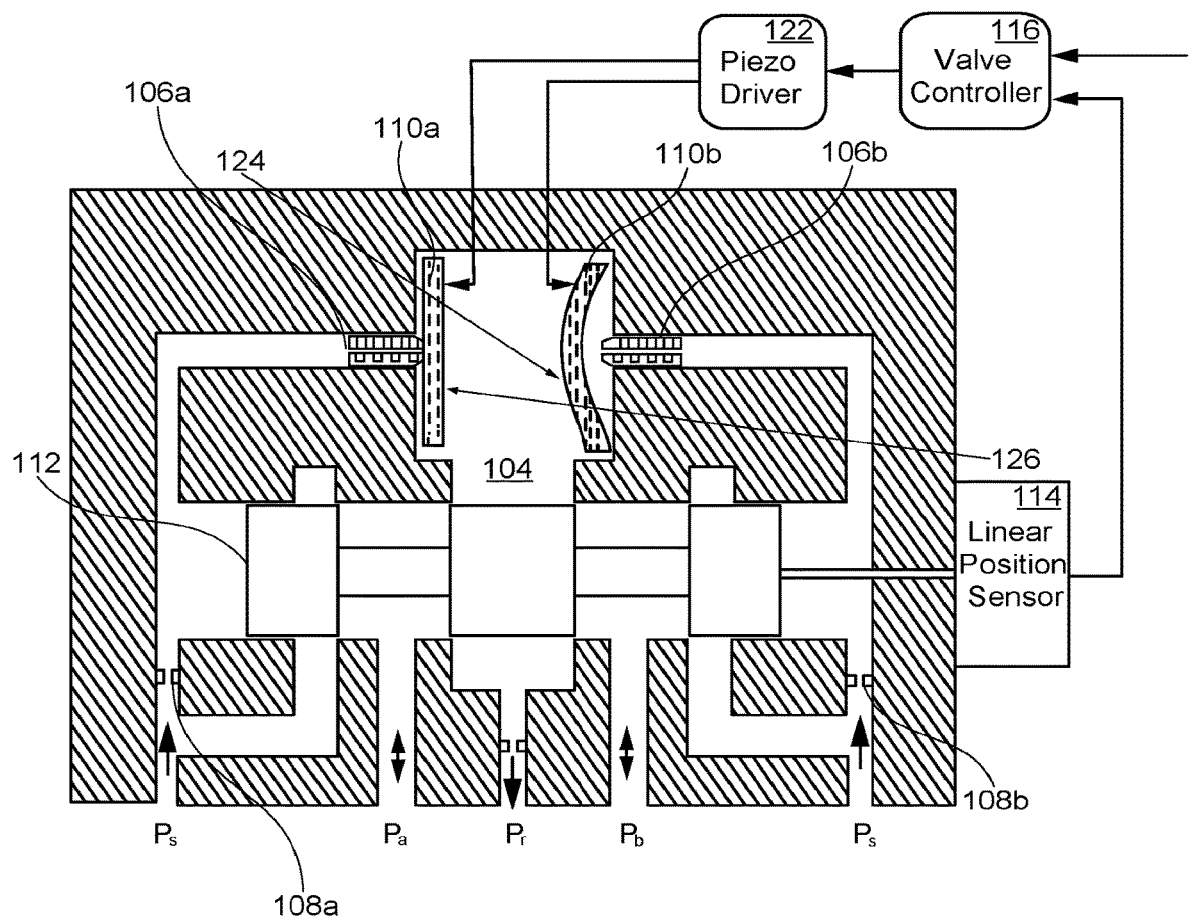
FIG. 3 illustrates a diagram of the piezoelectric ring bender servo valve assembly, showing a first piezoelectric bendable member in a closed position, and a second piezoelectric bendable member in an open position, in accordance with an embodiment of the present invention.

As illustrated in FIG. 3, the valve housing 102 forms a passageway 104 for carrying a fluid. The fluid may include, without limitation, a jet fuel, hydraulic oil, motor oil, and other aviation-related fluid known in the art. In some embodiments, a pair of nozzles 106a-b are operational inside the valve housing 102. The nozzles 106a, 106b are in fluid communication with the fluid. The nozzles 106a-b carry the fluid in a controlled manner to the appropriate outlet port.

In some embodiments, the nozzles 106a-b terminate at a pair of orifices 108a-b that discharge fluid outside the valve housing 102 through a passageway 104 to the fluid power return port Pr. The nozzle 106a-b may have a round shape with profiled passageway, or may protrude for creating a stable and stronger flow velocity.

In some embodiments, the pair of orifices 108a-b are connected to the same fluid power supply inlet port Ps. Orifices may have a round shape, or may protrude for creating a stronger flow velocity.

Figure 2:
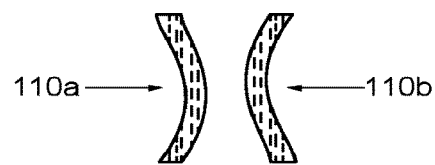
FIG. 2 illustrates an exemplary pair of piezoelectric bendable members, in accordance with an embodiment of the present invention.

Turning now to FIG. 2, the assembly 100 provides a pair of piezoelectric bendable members 110a-b that exhibit a piezoelectric effect. Those skilled in the art will recognize that the piezoelectric effect is the ability of certain materials to generate an electric charge in response to applied mechanical stress (the substance is squeezed or stretched). Conversely, a mechanical deformation (the substance shrinks or expends) is produced when an electric field is applied. The piezoelectric bendable members 110a-b are a replacement for the torque motors and the flappers, commonly used in the prior art. In essence, the bendable members 110a-b serve as an electrical to mechanical transducer, converting electrical signals into mechanical force and displacement. However, it is significant to note that the bendable members 110a-b perform the similar functions of regulating the flow through the nozzles 106a-b.

The piezoelectric bendable members 110a-b are operational to bend, so as to enable flow of the fluid through the nozzles 106a-b. In one embodiment, a piezo driver 122 actuates the piezoelectric bendable members 110a-b to bend, in response to electrical signal. The driver 122 is in operational contact with the valve controller 116. The piezoelectric bendable members 110a-b bend independently from each other. The piezoelectric bendable members 110a-b are thus, configured to independently regulate flow of the fluid through the nozzles 106a-b.

Figure 5:
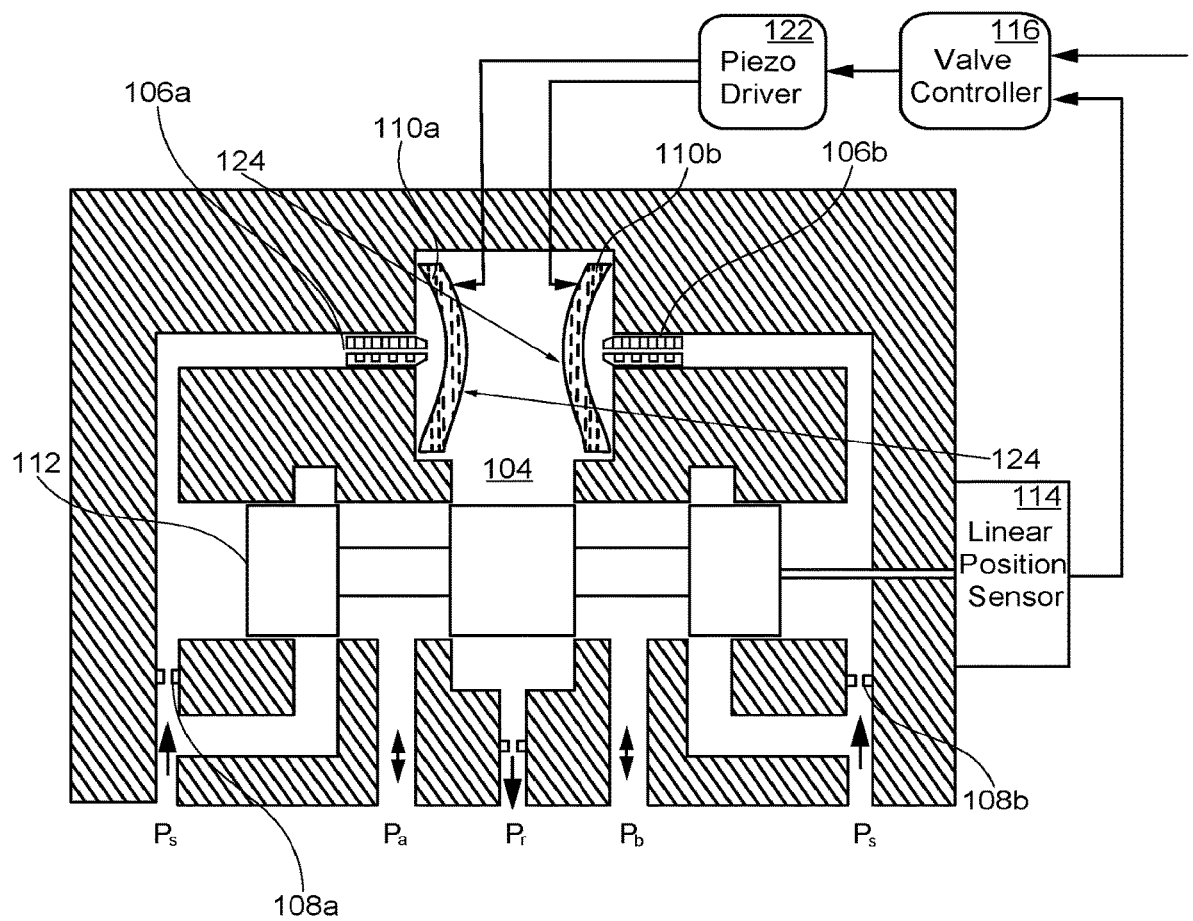
FIG. 5 illustrates a diagram of the piezoelectric ring bender servo valve assembly, showing both piezoelectric bendable members in an open position, in accordance with an embodiment of the present invention.
Figure 6:
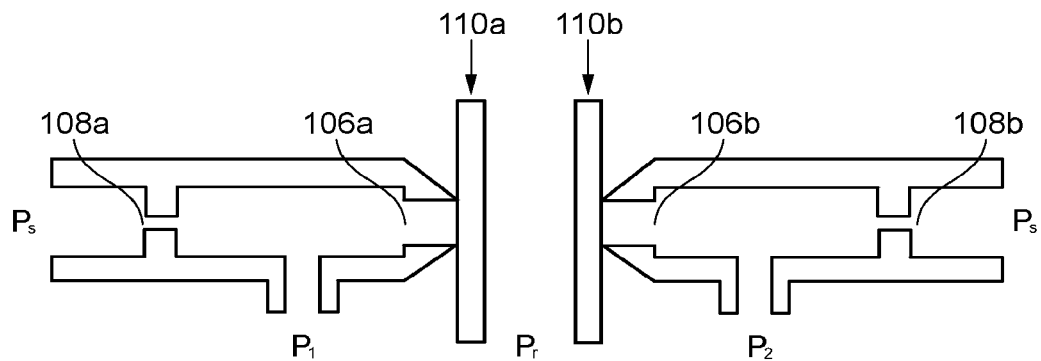
FIG. 6 illustrates a diagram of the piezoelectric bendable members in the closed position, in accordance with an embodiment of the present invention.

As FIG. 6 references, the piezoelectric bendable members 110a-b are disposed adjacent to the nozzles 106a-b, so that the piezoelectric bendable members 110a-b move between an open position 124 and a closed position 126 to regulate flow of the fluid through the nozzles 106a-b. Thus, from the closed position 126, the piezoelectric bendable members 110a-b block the flow of fluid through the nozzles 106a-b (FIG. 3). And from the open, bent position 124, the piezoelectric bendable members 110a-b enable controlled flowage of fluid through the nozzles 106a-b (FIG. 5).

Further, the piezoelectric bendable members 110a-b move between the open position 124 and the closed position 126 independently of each other. Thus as FIG. 3 shows, a first piezoelectric bendable member 110a can be in the closed position 126 to restrict flowage through the nozzle; while a second piezoelectric bendable member 110b can be in the open position 124 to enable flowage through the nozzle.

Figure 4:
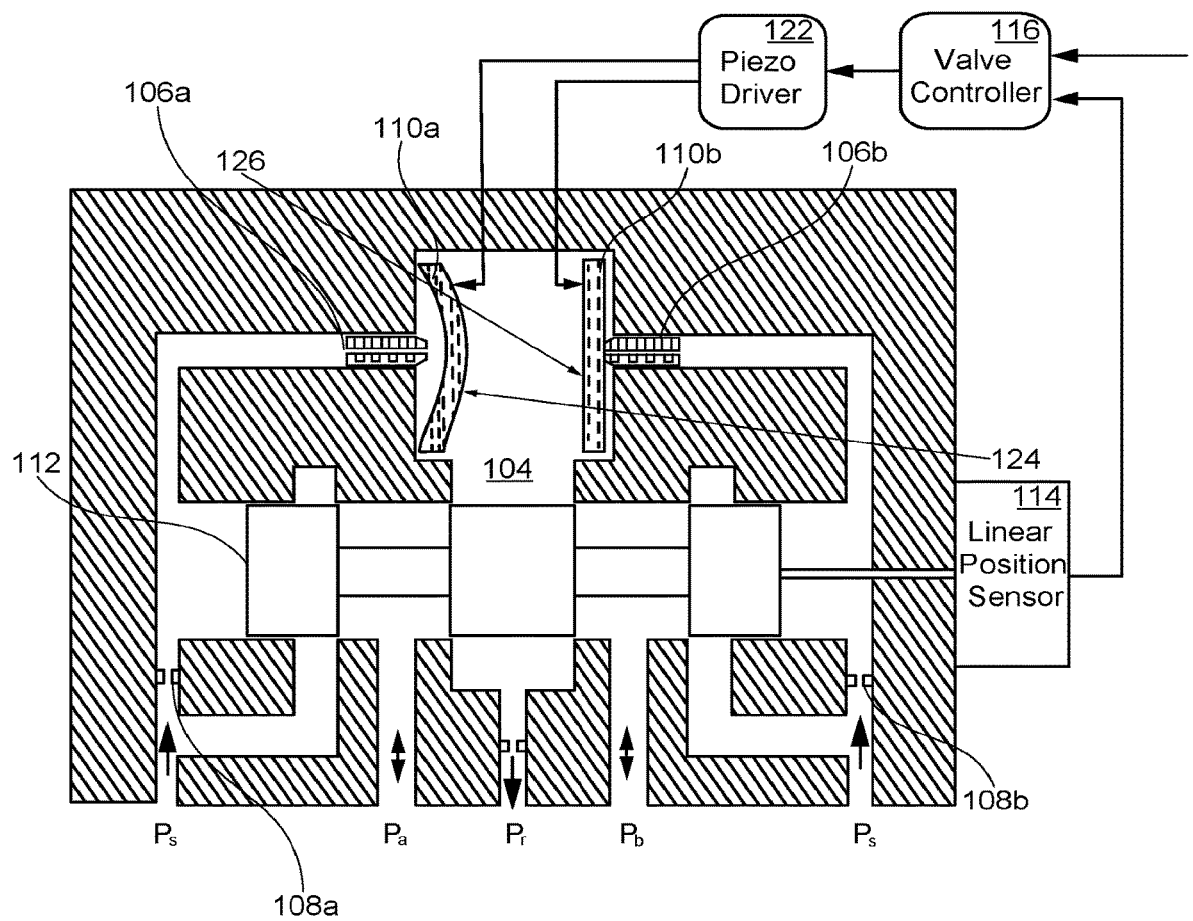
FIG. 4 illustrates a diagram of the piezoelectric ring bender servo valve assembly, showing a first piezoelectric bendable member in an open position, and a second piezoelectric bendable member in a closed position, in accordance with an embodiment of the present invention.

Conversely, FIG. 4 shows how the first piezoelectric bendable member 110a can be in the open position 124 to enable flowage through the nozzle; while the second piezoelectric bendable member 110b can be in the closed position 124 to restrict flowage through the nozzle. Thus, as FIGS. 1-4 illustrate, there are four combinations of positions for the two piezoelectric bendable member 110a, 110b.

In one non-limiting embodiment, the piezoelectric bendable members 110a-b comprises two piezoelectric ring benders. In another possible embodiment, the piezoelectric bendable members 110a-b comprise a monolayer made of one layer of piezoceramic material pressed with up to 1 MN compacting force. The piezoelectric bendable members 110a-b may also be made up of a multilayer made by tape casting very thin layers of piezoceramic material on which thin layers of electrode material is deposited. Other piezoelectric materials and build compositions may also be used.

Looking again at FIG. 1, the assembly 100 comprises a spool valve 112. The spool valve 112 is disposed in at least one spool position to regulate flow of fluid through passageway 104. In one embodiment, the spool valve 112 is substantially a type of directional control valve. The spool valve 112 allows the fluid flow into different paths from one or more sources. The spool valve 112 comprises a spool inside a cylinder which is mechanically or electrically controlled.

Consequently, the assembly 100 does not rely on a feedback spring to control the spool valve 112. Rather, the assembly 100 utilizes a linear position sensing device 114 that is operationally connected to the spool valve 112. The linear positioning sensing device 114 is configured to measure and provide feedback about the spool position. In this manner, the spool position dictates operation of the piezoelectric bendable members 110a-b.

Further, a valve controller 116 is operationally connected to the linear position sensing device 114. The valve controller 116 receives the feedback from the linear position sensing device 114, and processes it accordingly. The valve controller 116 allows the spool valve 112 to move until the spool position achieves a command position, and the force on the spool valve 112 is in equilibrium with the pressure difference across the spool valve 112.

Figure 7:
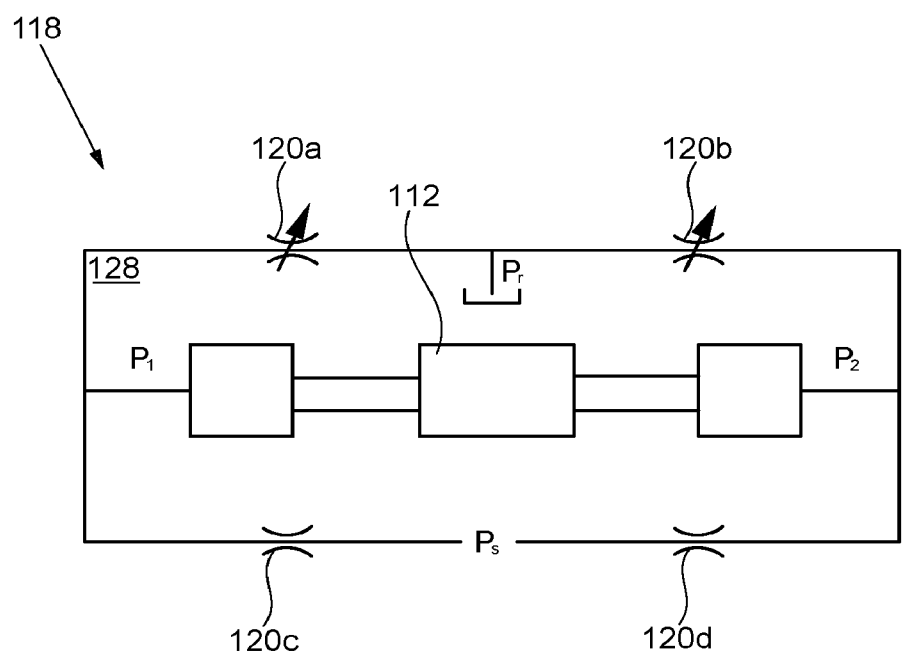
FIG. 7 illustrates a diagram of an exemplary spool valve, in accordance with an embodiment of the present invention.

FIG. 7 illustrates a diagram of an exemplary spool valve and H-bridge 118. In some embodiments, the H-bridge 118 may include four switches 120a-d that are operable to switch the polarity of a differential pressure applied across to a load 112. With the H-bridge 118, it is the pair of nozzles 106a-b that act as variable restrictors controlled by valve control software.

In some embodiments, the variable restrictors generate a pressure difference across the spool valve 112 when the piezo bendable members 110a-b bend away from the nozzles 106a-b to the open position 124. Piezo driver 122 generates a control voltage proportional to the electrical command signal from the valve controller 116 to control bending of the piezoelectric bendable members 110a-b from their closed position 126. Consequently, the flow of fluid is less reliant on mechanical components, such as a torque motor, feedback spring, and flappers. The variable restrictor is operatively connected to the nozzles. The variable restrictor generates a pressure difference across the spool valve 112 when the two curtain-area between the piezoelectric bendable member and the nozzle are not the same. The curtain area is defined as the cylinder surface area of jet flow from the nozzle to the piezoelectric bendable member. The curtain area equation: $\pi*D*x$. where D is the nozzle diameter, x is the distance between the nozzle and the piezoelectric bendable member.

In conclusion, the piezoelectric ring bender servo valve assembly 100 reduces mechanical wear in an aircraft flight control actuation and fuel control system by removing mechanical components used in prior art servo valves. A pair of piezoelectric ring benders 110a-b are mounted directly adjacent to a pair of nozzles 106a-b. The bendable members independently regulate the flow of fluid through the nozzles.

Further, a linear position sensing device 114 measures and provides feedback about the spool position to a valve controller. The valve controller allows the spool valve to move until the valve position achieves command position and the force on the spool valve is in equilibrium with pressure difference across the spool valve.

Further, the assembly provides an H-bridge 118 where the nozzles are the variable restrictors controlled by valve control software, generating a pressure difference across the spool valve when piezoelectric bendable members bend away from the nozzle. Thus, the advantage occurs in which no torque motor, flapper, feedback spring, or other moving parts for aircraft flight control actuation and fuel control systems are utilized.

These and other advantages of the invention will be further understood and appreciated by those skilled in the art by reference to the following written specification, claims and appended drawings.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A piezoelectric ring bender servo valve assembly, the assembly comprising:
   a valve housing, the valve housing being defined by a passageway, the passageway being operable to carry a fluid;
   a pair of nozzles, the nozzles being in communication with the fluid, the nozzles terminating at a pair of orifices;
   a pair of piezoelectric members disposed adjacent to the nozzles, the piezoelectric members being operable to move to an open position away from the nozzles to enable an increase in flowage of the fluid through the nozzles, the piezoelectric members being operable to return towards the nozzles to enable a decrease flowage of the fluid through the nozzles;
   a spool valve operationally connected to the piezoelectric members, the spool valve being disposed in at least one spool position to regulate flow of the fluid through the passageway, the pair of piezoelectric members directly controlling operation of the spool position;
   a linear position sensing device operationally connected to the spool valve, the linear positioning device determining the spool position of the spool valve, the linear positioning device providing feedback about the spool position;
   a valve controller operationally connected to the linear position sensing device, the valve controller receiving the feedback from the linear position sensing device, whereby based on the feedback the valve controller transmitting an electrical command signal to a piezo driver to move the spool valve until the spool position is traversed to a command position;
   the piezo driver generating a voltage applied to the pair of piezo electric members based on the electrical command signal from the valve controller to move the pair of piezoelectric members;
   wherein the pair of nozzles and the pair of piezoelectric members together constituting a pair of variable restrictors, and the variable restrictors generating a pressure difference across the spool valve;
   a pair of flow restricting orifices connected to a fluid power supply inlet port, wherein each of the flow restricting orifices is arranged in the valve housing upstream of a respective pilot chamber of the spool valve and in parallel to a respective fluid power supply channel that is located upstream of the spool valve; and
   wherein the spool valve controls flow through each of the fluid power supply channels.

2. The assembly of claim 1 wherein the piezoelectric members are piezoelectric bendable members.

3. The assembly of claim 1, wherein the assembly forms an H-bridge that is operable to switch a polarity of a differential pressure applied across the spool valve.

4. The assembly of claim 3, wherein the H-bridge further comprises the flow restricting orifices and the variable restrictors.

5. The assembly of claim 1, wherein the pair of piezoelectric members are each a piezoelectric ring bender.

6. The assembly of claim 1 wherein the piezo driver is a single piezo driver.

7. The assembly of claim 1 wherein the valve controller is a single valve controller.

8. The assembly of claim 1, further comprising a control loop.

9. The assembly of claim 8, wherein the spool position is in a closed position control loop.

10. The assembly of claim 9, wherein a closed spool position control loop enables parameter degradation inside the loop to be compensated by the control loop.

11. A piezoelectric ring bender servo valve assembly, the assembly comprising:
a valve housing, the valve housing being defined by a passageway, the passageway being operable to carry a fluid;
first and second nozzles, the first and second nozzles being in communication with the fluid, the first and second nozzles terminating at first and second orifices;
first and second piezoelectric members disposed adjacent to the first and second nozzles, the piezoelectric members being operable to move to an open position away from the nozzles to enable an increase in flowage of the fluid through the nozzles, the piezoelectric members being operable to return towards the nozzles to enable a decrease flowage of the fluid through the nozzles;
a spool valve operationally connected to the piezoelectric members, the spool valve being disposed in at least one spool position to regulate flow of the fluid through the passageway, the first and second piezoelectric members directly controlling movement of the spool position;
a linear position sensing device operationally connected to a valve controller, the linear positioning device determining the spool position of the spool valve, the linear positioning device providing feedback about the spool position to the valve controller;
the valve controller operationally connected to the linear position sensing device, the valve controller receiving the feedback from the linear position sensing device, whereby based on the feedback the valve controller transmitting an electrical command signal to a piezo driver to move the spool valve until the spool position is traversed to a command position;
the piezo driver generating voltage based on the electrical command signal from the valve controller to independently control movement of the piezoelectric members;
a pair of flow restricting orifices connected to a fluid power supply inlet port, wherein each of the flow restricting orifices is arranged in the valve housing upstream of a respective pilot chamber of the spool valve and in parallel to a respective fluid power supply channel that is located upstream of the spool valve; and
wherein the spool valve controls flow through each of the fluid power supply channels.

12. The assembly of claim 11 wherein the piezoelectric members are piezoelectric bendable members.

13. The assembly of claim 11, wherein the assembly forms an H-bridge that is operable to switch a polarity of a differential pressure applied across to a load.

14. The assembly of claim 13, wherein the H-bridge further comprises the flow restricting orifices and the variable restrictors.

15. The assembly of claim 11, wherein the pair piezoelectric members are each a piezoelectric ring bender.

16. The assembly of claim 11 wherein the piezo driver is a single piezo driver.

17. The assembly of claim 11 wherein the valve controller is a single valve controller.

18. The assembly of claim 11, further comprising a control loop.

19. The assembly of claim 18, wherein the spool position is in a closed position control loop.

20. The assembly of claim 19, wherein a closed spool position control loop enables parameter degradation inside the loop to be compensated by the control loop.

* * * * *